United States Patent [19]

Kawamura et al.

[11] Patent Number: 5,124,621
[45] Date of Patent: Jun. 23, 1992

[54] REFERENCE POINT RETURN SYSTEM

[75] Inventors: Hideaki Kawamura; Shigeru Isohata, both of Hachioji, Japan

[73] Assignee: Fanuc Ltd., Yamanashi, Japan

[21] Appl. No.: 613,723
[22] PCT Filed: Apr. 7, 1990
[86] PCT No.: PCT/JP90/00479
  § 371 Date: Dec. 4, 1990
  § 102(e) Date: Dec. 4, 1990
[87] PCT Pub. No.: WO90/13075
  PCT Pub. Date: Nov. 1, 1990

[30] Foreign Application Priority Data

Apr. 18, 1989 [JP] Japan .................. 1-98166

[51] Int. Cl.⁵ .............................. G05B 19/18
[52] U.S. Cl. .............................. 318/569; 318/563; 318/632; 364/474.14
[58] Field of Search ............ 318/569, 563, 632; 364/474.14

[56] References Cited

U.S. PATENT DOCUMENTS

| 4,225,928 | 9/1980 | Ohkubo | 364/474.14 |
| 4,484,287 | 11/1984 | Gamo et al. | 318/563 X |
| 4,782,275 | 11/1988 | Sakamoto et al. | 318/569 |
| 4,794,311 | 11/1988 | Kiya et al. | 318/569 |

FOREIGN PATENT DOCUMENTS

| 0187868 | 7/1986 | European Pat. Off. |
| 394472 | 10/1990 | European Pat. Off. |
| 0067715 | 12/2282 | European Pat. Off. |
| 3237857 | 5/1983 | Fed. Rep. of Germany |

Primary Examiner—William M. Shoop, Jr.
Assistant Examiner—Saul M. Bergmann
Attorney, Agent, or Firm—Staas & Halsey

[57] ABSTRACT

A system is provided for carrying out a reference point return in a numerical control device. A deceleration dog (31) is arranged at a machine table (1) and includes a reference point (4). A deceleration limit switch (2) is operated when in contact with the deceleration dog (31), to generate a first deceleration signal (DEC1). A portion of the deceleration dog (31) from an end thereof with which the deceleration limit switch (2) first comes into contact to a predetermined distance therefrom is used as a hypothetical dog. A deceleration signal generating means generates a second deceleration signal (DEC1) when the deceleration limit switch (2) is in contact with the hypothetical dog. A reference point return processing means carries out a reference point return based on the first and second deceleration signals (DEC1, DEC2). Accordingly, an adjustment of the deceleration dog becomes unnecessary, and the assembling and maintenance are made easy.

2 Claims, 4 Drawing Sheets

REFERENCE POINT RETURN SYSTEM

TECHNICAL FIELD

The present invention relates to a system for carrying out a reference point return in a numerical control device, and more particularly, to a reference point return system by which an adjustment of a deceleration dog on a machine side is simplified.

BACKGROUND ART

Numerical control devices have a reference point return function of returning a table or the like of a machine tool to a reference point, whereby the table or the like is manually moved toward the reference point after the power is turned on, and is decelerated in accordance with a signal from a deceleration limit switch. After the deceleration, the table or the like is then moved at a constant low speed (decelerated speed), and is stopped at a point in an electrical grid at which the deceleration limit switch loses contact with the deceleration dog and thus is closed.

FIG. 4 is a conceptual diagram of a conventional reference point return system. As shown in the figure, a deceleration dog 3 is fixed to a machine table 1, and the end of this deceleration dog 3 is set in such a manner that it is positioned between an electrical grid point GP2 corresponding to a reference point 4 and an electrical grid point GP1 on the left thereof. When the machine table 1 is moved in the direction shown by an arrow 1a, a deceleration limit switch 2, which is not in contact with the deceleration dog 3, is moved relative to the machine table 1 and comes into contact with the deceleration dog 3. The deceleration limit switch 2 is operated while it is in contact with the deceleration dog 3, i.e., for the length in the X axis direction of the deceleration dog 3, and outputs an off-state deceleration signal DEC.

As for a reference point return, the machine table 1 is moved in the direction shown by the arrow 1a at a rapid feed speed VH, by setting a mode select switch on an operator panel to a JOG mode, turning a reference point return switch ON, and pushing a feed button (+X) in the X axis direction. When the front end of the deceleration dog 3 reaches the deceleration limit switch 2, the deceleration signal DEC is turned off, and a deceleration of the machine table 1 is started. After the deceleration is ended, the machine table 1 is moved at a constant low speed VL after the deceleration, and the deceleration dog 3 is stopped at the electrical grid point GP2, after passing over the deceleration limit switch 2, to thereby end the reference point return.

Namely, a reference point return processing means of a numerical control device (CNC) reduces the moving speed VH of the machine table 1, and it is then moved at the constant low speed VL by a servomotor, not shown, in accordance with an output of the off-state deceleration signal DEC. When the deceleration dog 3 has passed the deceleration limit switch 2 during the movement at the constant low speed VL, the deceleration signal DEC is turned on. The reference point return processing means stops the machine table 1 at the first electrical grid point GP2 reached thereby after this deceleration signal DEC is made on. The reference point return is carried out by this series of operations. The deceleration limit switch 2 is provided with a break contact, and therefore, the on/off switching thereof is converse to the contact/non-contact thereof with the deceleration dog. Namely, while the deceleration dog 3 is passing over the deceleration limit switch 2, the deceleration signal DEC is made off.

The conventional reference point return system requires a deceleration dog having a length predetermined in accordance with the machine concerned, and this length must be set in accordance with the deceleration distance of the machine table.

Also, an adjustment is required so that the position at which the deceleration limit switch 2 is turned on, i.e., the position at which the trailing end of the deceleration dog 3 is located, is in the middle of the electrical grid points (between GP1 and GP2 in FIG. 4). This adjustment is extremely minute, because the pitch of the electrical grid is about several millimeters to 10 mm, and a problem arises in that a misadjustment can cause a deviation of one pitch.

Further, if the deceleration dog 3 is located under the machine table 1, for example, an external cover and the like must be removed to enable an accurate adjustment of the position of the deceleration dog, thus making the assembling and maintenance complicated.

No problem arises if the starting point of the reference point return (the position of the deceleration limit switch 2 relative to the machine table 1) is sufficiently far from the deceleration dog 3, such as R1, but if the starting point of the reference point return is located at the middle position R2 of the deceleration dog 3 or at the position R3 between the deceleration dog 3 and the reference point GP2, the operator must move the point from the positions R2 and R3.

SUMMARY OF THE INVENTION

The present invention was contrived in view of the above circumstances, and an object thereof is to provide a reference point return system by which an adjustment of a deceleration dog on a machine side is simplified.

To achieve the above object, the present invention provides a system for returning a machine table to a reference point by using a numerical control device, comprising a deceleration dog arranged at the machine table and including the reference point, a deceleration limit switch operated when in contact with the deceleration dog, for generating a first deceleration signal, a deceleration signal generating means for generating a second deceleration signal when the deceleration limit switch is in contact with a hypothetical dog, which corresponds to a portion of the deceleration dog from an end thereof with which the deceleration limit switch first comes into contact to a predetermined distance therefrom, and a reference point return processing means for carrying out a reference point return based on the first and the second deceleration signals.

Since the deceleration dog includes the reference point, the deceleration limit switch continues to output the first deceleration signal while it is in contact with the deceleration dog. The hypothetical dog is generated in the numerical control device and can be freely changed by setting a parameter, and the second deceleration signal is output when the hypothetical dog is in contact with the deceleration limit switch. Accordingly, the reference point return processing means carries out a normal reference point return based on the second deceleration signal from this hypothetical dog.

When the first deceleration signal is output from the deceleration limit switch at the start of a reference point return, which means that the deceleration limit switch is in the vicinity of the reference point, a reference point return is carried out after the machine table is once moved in the reverse direction by the numerical control device. Accordingly, the adjustment of the deceleration dog becomes unnecessary and a moving of the deceleration limit switch from the deceleration dog can be carried out prior to the reference point return by the numerical control device side.

BEST MODE OF CARRYING OUT THE INVENTION

Embodiments of the present invention will be described with reference to the drawings.

Figure 1:
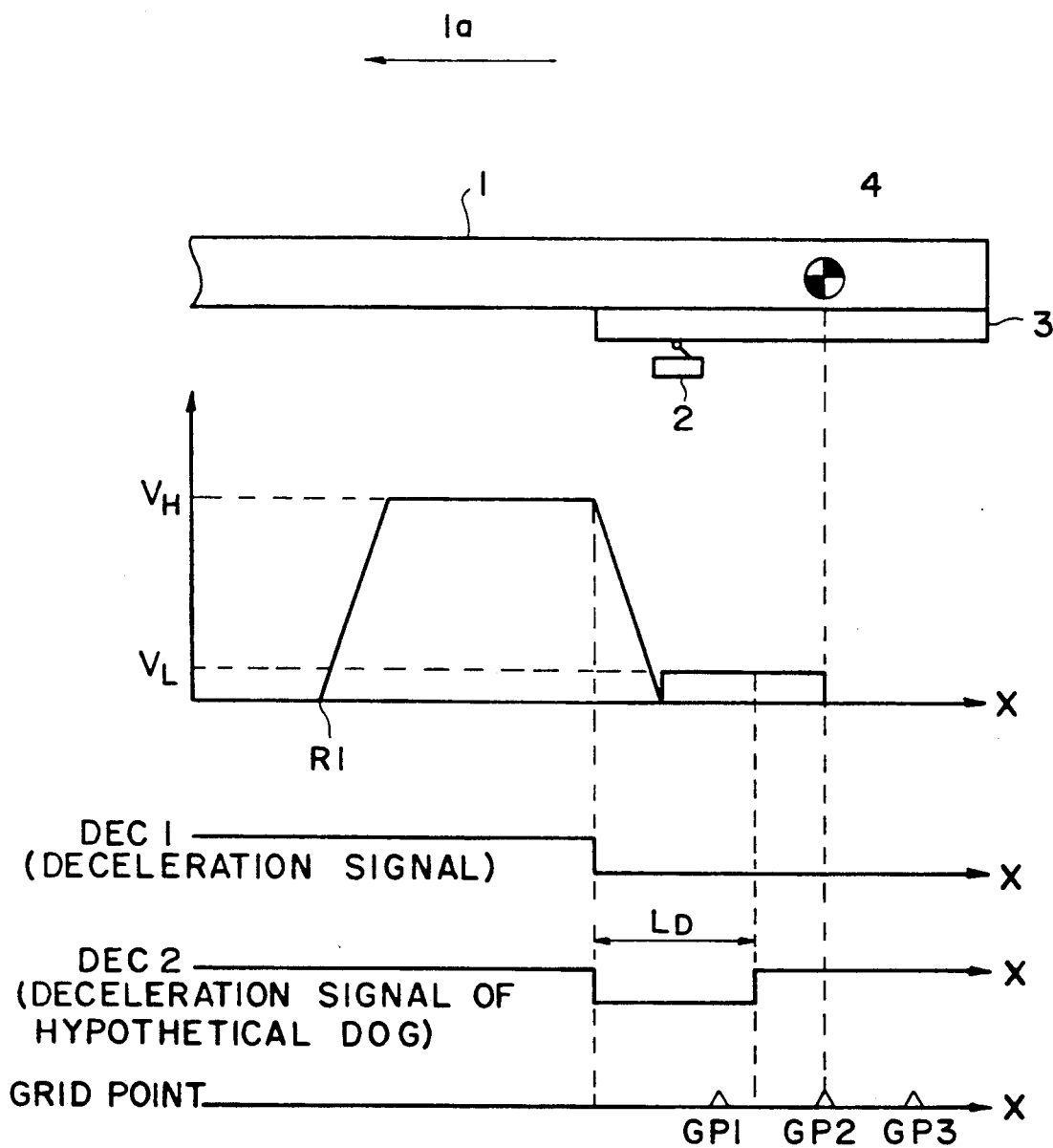
FIG. 1 is a conceptual diagram illustrating a preferred embodiment of a reference point return system according to the present invention.

FIG. 1 is a conceptual diagram illustrating a reference point return system according to the present invention, wherein a deceleration dog 31 is secured to the underside of a machine table 1. This deceleration dog 31 is longer than the conventional dog and is arranged in such a manner that it includes an electrical grid point corresponding to a reference point. Accordingly, the deceleration limit switch 2 outputs a deceleration signal DEC1 while it is in contact with the deceleration dog 31.

The deceleration signal DEC1 from the deceleration limit switch 2 is input to a reference point return processing means of a numerical control device (CNC), in which data on a hypothetical dog having a length LD corresponding to the length of the conventional deceleration dog is prestored. The length LD of this hypothetical dog is prestored in a nonvolatile memory or the like, and this deceleration signal generating means detects a state in which the deceleration limit switch 2 is in contact with a portion of the deceleration dog 31 from an end thereof with which the deceleration limit 2 switch first comes into contact to the predetermined distance LD, and outputs a deceleration signal DEC2. Accordingly, if the deceleration limit switch 2 is determined to touch a part other than the range LD of the hypothetical dog, the deceleration signal DEC2 is not output. Note, instead of setting a length of the hypothetical dog, a time period corresponding to this length can be set.

A reference point return is carried out as follows. A mode select switch on an operator panel is set to a JOG mode, a reference point return switch is turned on, a feed button (+X) in the X axis direction is pressed, and the machine table 1 is then moved in the direction of the reference point at a rapid feed speed VH. When the deceleration dog 31 reaches the deceleration limit switch 2, the deceleration signal DEC1 and the deceleration signal DEC2 of the hypothetical dog are turned off, and a deceleration of the machine table 1 is started. After the deceleration, the machine table 1 is moved at a low speed VL and this movement is completed at the electrical grid point GP2 after passing the length LD of the hypothetical dog, to thereby end the reference point return process.

As the length LD of the hypothetical dog corresponds to the length of the conventional deceleration dog 3, and is set as a parameter, the reference point can be set at the electrical grid point GP3 merely by a setting operation such that the trailing end of the length LD of signal DEC2 would reach the middle of the electrical grid points GP2 and GP3.

As mentioned above, as the reference point return processing means carries out a reference point return by the deceleration signal DEC2 output in accordance with the length LD of the hypothetical dog, the same reference point return as before can be executed. Also, a reference point return can be easily carried out only by adjusting the length of the hypothetical dog in the numerical control device, without the need to take into account the mounting position, mounting accuracy and the like of the deceleration dog.

Next, a reference point return where the starting point of the reference point return is in the middle of the deceleration dog 31 will be described.

Figure 2:
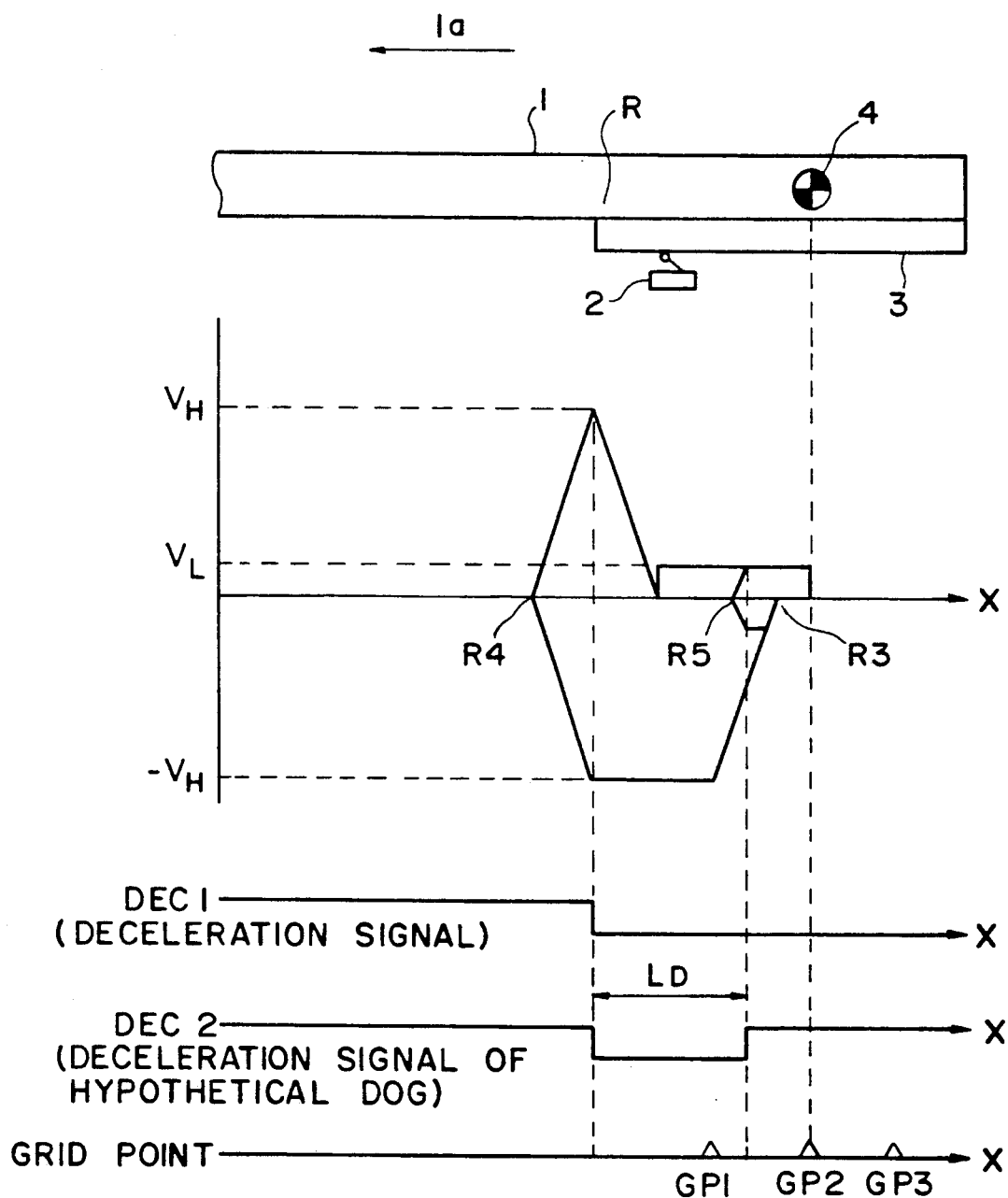
FIG. 2 is a conceptual diagram illustrating another preferred embodiment of a reference point return system according to the present invention.

FIG. 2 is a diagram illustrating a reference point return process where the starting point of the reference point return is in the middle of the deceleration dog 31.

When the deceleration limit switch 2 is at the middle position R of the deceleration dog 31, the deceleration signal DEC1 is continuously output, and accordingly, when the reference point return processing means in the numerical control device detects the deceleration signal DEC1 at the start of the reference point return, the machine table 1 is moved in the reverse direction at a speed −VH, and thus the contact between the deceleration limit switch 2 and the deceleration dog 31 is broken. When the deceleration limit switch 2 loses contact with the deceleration dog 31, i.e., the deceleration signal DEC1 is made on, the speed is reduced until a reference point return start point R4 is reached, and the same reference point return process as in FIG. 1 is carried out again. In another example, when the reference point return processing means in the numerical control device detects the deceleration signal DEC1, the machine table 1 is moved in the reverse direction at a speed −VL, so that the deceleration limit switch 2 comes into contact with the hypothetical dog. When the deceleration limit switch 2 touches the hypothetical dog, i.e., the deceleration signal DEC2 is made off, the speed is reduced until a reference point return start point R5 is reached. Then, the machine table 1 is moved at the low speed VL and stopped at the electrical grid point GP2 after passing the length LD of the hypothetical dog, to thereby end the reference point return process. In this example, it is unnecessary to rapidly increase or decrease the speed of the servomotor, and the reference point return process can be completed sooner.

Moreover, when the deceleration limit switch 2 is located in the middle of the hypothetical dog, a reference point return can be carried out at the low speed VL after once moving and decelerating the machine table in the reverse direction at the low speed −VL.

Figure 3:
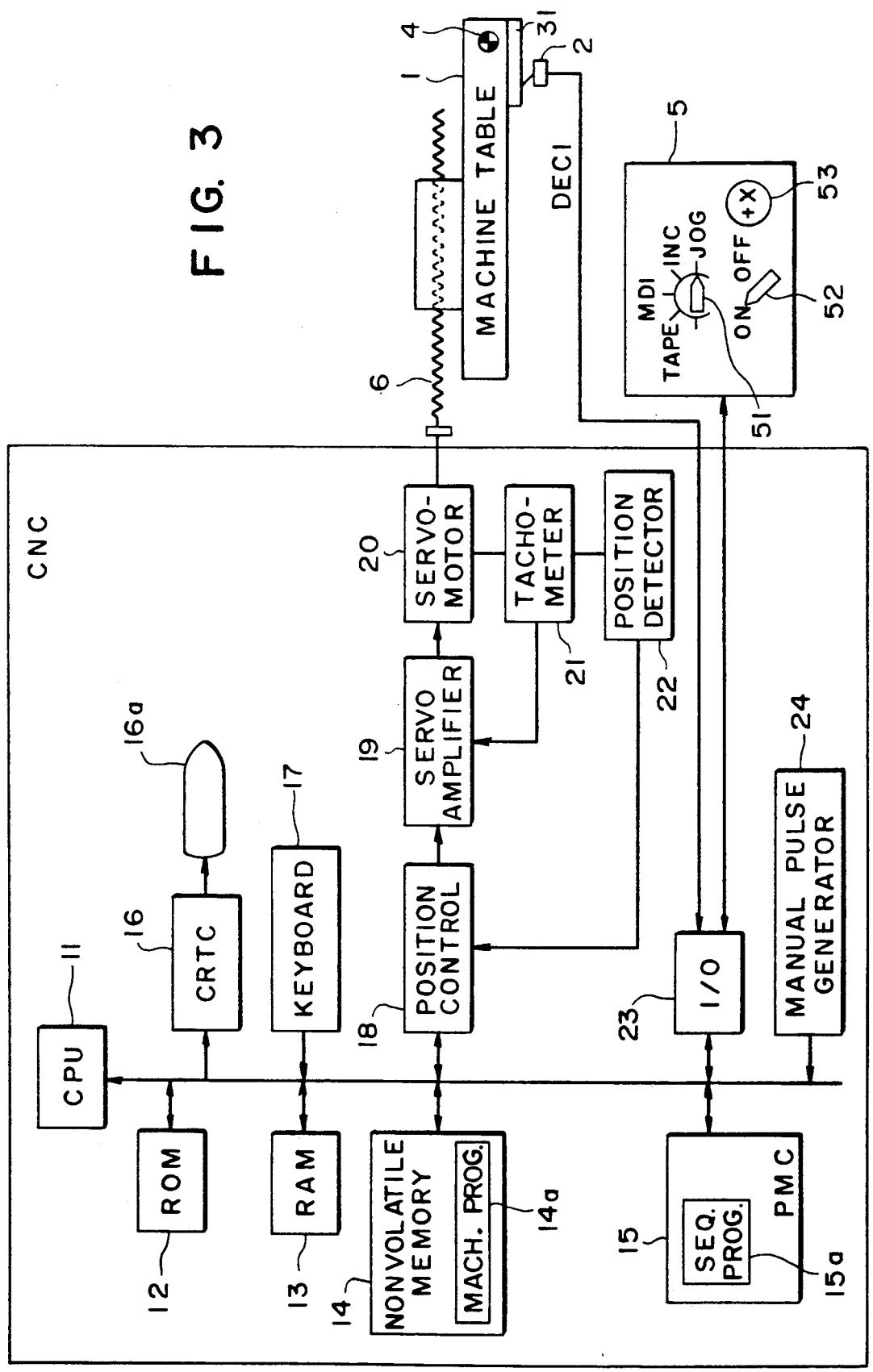
FIG. 3 is a diagram illustrating a hardware arrangement of a numerical control device, and a connection thereof with a machine table.
Figure 4:
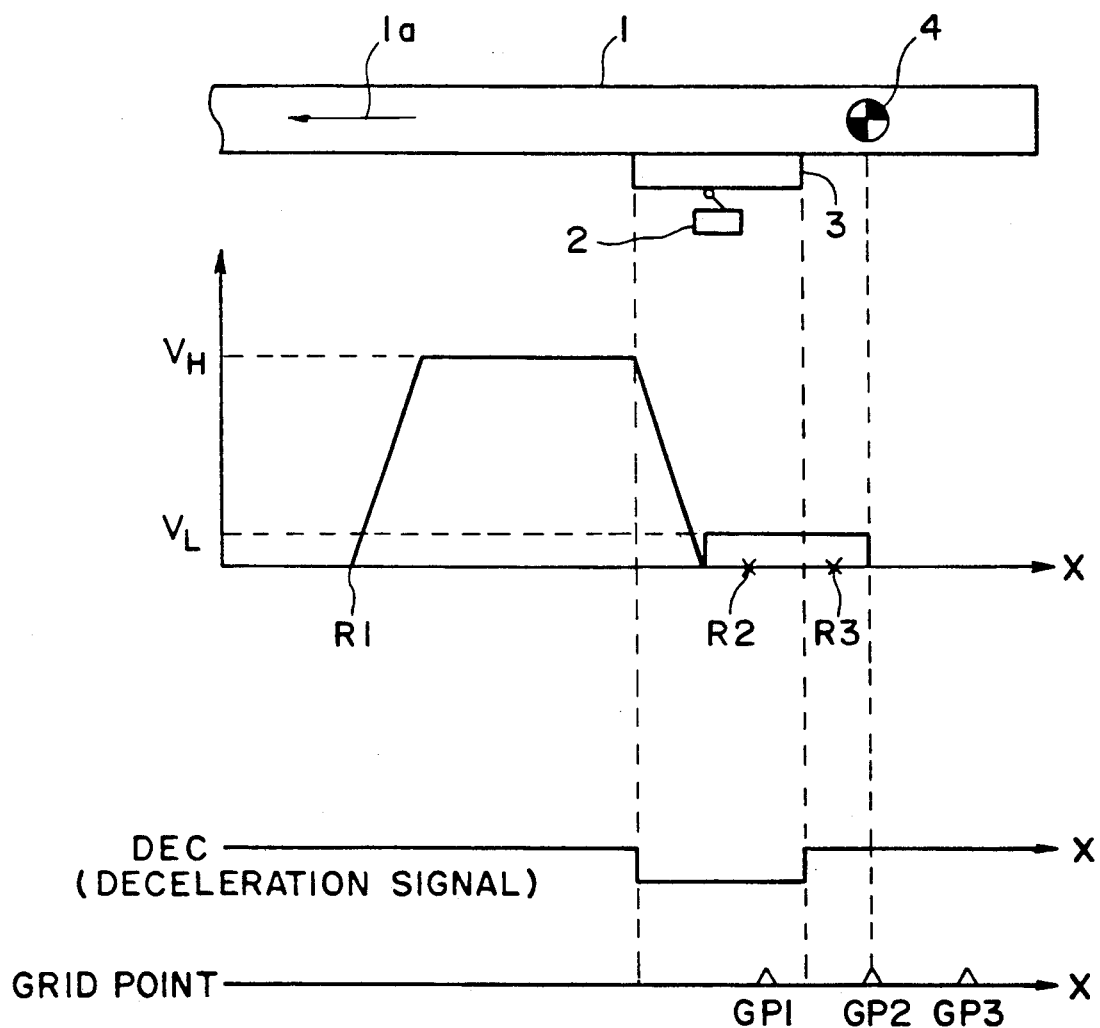
FIG. 4 is a conceptual diagram of a conventional reference point return system.

FIG. 3 illustrates the arrangement of the hardware of the numerical control device (CNC), and a connection thereof with the machine table 1.

The machine table 1 is connected to a servomotor 20 through a ball screw 6, and the ball screw 6 is rotated in accordance with the rotation of the servomotor 20. Accordingly, the machine table 1 is moved in the X axis direction by the rotation of the ball screw 6. The arrangement of the machine table 1, the deceleration dog 31 and the deceleration limit switch 2 is identical to that shown in FIG. 1, and thus a description thereof is omitted. An operator panel 5 is provided on the machine side, and includes a mode select switch 51, a reference point return switch 52, and a feed button 53 in the X axis direction. The operator panel 5 has many other switches, but these are omitted from the figure illustrating this embodiment, for simplicity.

The processor 11 acts as a processor at the center of the global control of the numerical control device (CNC) and carries out a control of the whole numerical control device (CNC) according to a system program stored in a ROM 12. An EPROM or EEPROM is used for the ROM 12. A DRAM is used for a RAM 13, to store various data such as temporary calculation data and display data. Tool correction amounts, a machining program 14a, and various parameters are stored in a nonvolatile memory 14, which comprises a CMOS or the like backed up by a battery, whereby the contents thereof are retained even after the power supply to the numerical control device is disconnected. Accordingly, the length LD of the hypothetical dog is set in this nonvolatile memory as a parameter.

A PMC (programmable machine controller) 15 receives commands such as an M-function and T-function, etc., converts them into signals for controlling a machine tool by a sequence program 15a, and outputs the converted signals. Also, the PMC receives a signal from the limit switch on the machine side, or various signals from the machine operator panel 5, and processes them in accordance with the sequence program. Signals necessary for the processing are stored in the RAM 13 via a bus, and are read by the processor 11.

A display control circuit 16 converts data such as the current positions of various axes, and movement amounts, etc., into a display signal, and outputs that signal to a display device 16a, which displays this display signal. A CRT, liquid crystal display unit or the like is used for the display device 16a, and a keyboard 17 is used for inputting various data.

A position control circuit 18 receives a position command from the processor and outputs a speed command signal to a servo amplifier 19, for controlling the servomotor 20. The servo amplifier 19 amplifies this speed command signal and drives the servomotor 20. A position detector 22 for outputting a position feedback signal and a tachometer generator 21 for generating a speed feedback signal are connected to the servomotor 20. A pulse coder or the like is used for the position detector 22, which feeds back a position feedback pulse to the position control circuit 18, but a position detector such as a linear scale or the like may be used, depending on the circumstances. The tachometer generator 21 feeds back a voltage signal corresponding to the rotation signal of the servomotor 20 to the servo amplifier 19, but instead of the tachometer generator, a speed signal may be generated from a position signal from the position detector 22, and the tachometer generator omitted. The required number of these elements corresponds to the number of axes, but only those necessary for one axis are illustrated.

An input/output circuit 23 transfers digital signals with respect to the machine side. The deceleration signal DEC1 of the deceleration limit switch 2 is input to this input/output circuit 23, and a tool select signal (T signal) for controlling tool changes, etc., is output from this input/output circuit 23 to a machine side control circuit. A manual pulse generator 24 outputs a pulse train for accurately moving each of the axes in accordance with the rotation angle, and is usually mounted on the operator panel 5, although separately illustrated in this embodiment.

A spindle amplifier and a spindle motor, etc., for controlling a spindle, are omitted in the figure.

Also, only one processor is employed in the above embodiment, but a multi-processing system using a plurality of processors may be used, depending on the system, to increase the processing speed.

As described above, according to the present invention, the reference point return processing means carries out a reference point return based on the second deceleration signal from the hypothetical dog. Accordingly, only the length of the hypothetical dog need be set as a parameter, and it is not necessary to change the length of the deceleration dog on the machine side, or to adjust the position of the deceleration dog, thereby facilitating the assembling and maintenance of machine tools.

We claim:

1. A reference point return system for returning a machine table to a reference point by a numerical control device, comprising:
    a deceleration dog connected to the machine table and including the reference point;
    a deceleration limit switch operated when in contact with the deceleration dog, for generating a first deceleration signal;
    deceleration signal generating means for generating a second deceleration signal when the deceleration limit switch is determined to be in contact with a hypothetical dog, which corresponds to a portion of the deceleration dog from an end thereof with which the deceleration limit switch first comes into contact to a predetermined distance therefrom; and
    reference point return processing means for executing a reference point return based on the first and second deceleration signals.

2. A reference point return system according to claim 1, wherein said reference point return processing means includes means, when the first deceleration signal is not generated at the start of a reference point return process, for moving the machine table at a rapid feed speed, for decelerating the machine table upon the generation of the first deceleration signal, and for executing a reference point return by stopping the machine table at a first electrical grid point reached after the second deceleration signal is turned off, and for moving the machine table in a reverse direction to a position at which the first deceleration signal is not generated, and for executing a reference point return when the first deceleration signal is generated.

* * * * *